Sept. 21, 1965    D. R. WALKER    3,207,640
METHOD OF MAKING REINFORCED MATERIAL
Original Filed Feb. 18, 1958    2 Sheets-Sheet 1
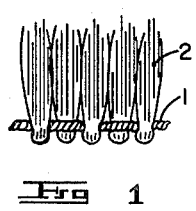
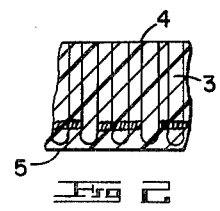
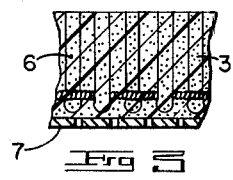
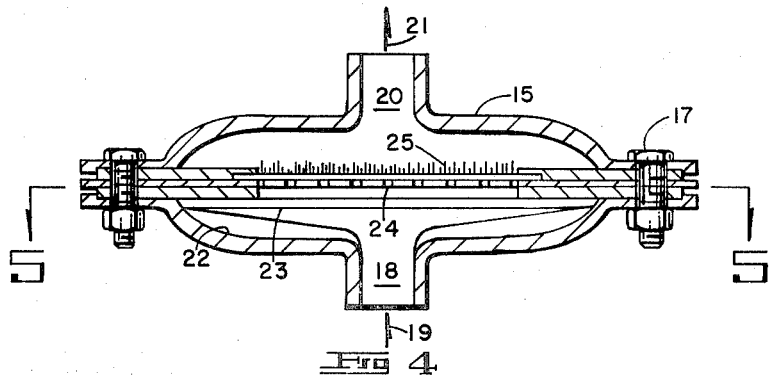
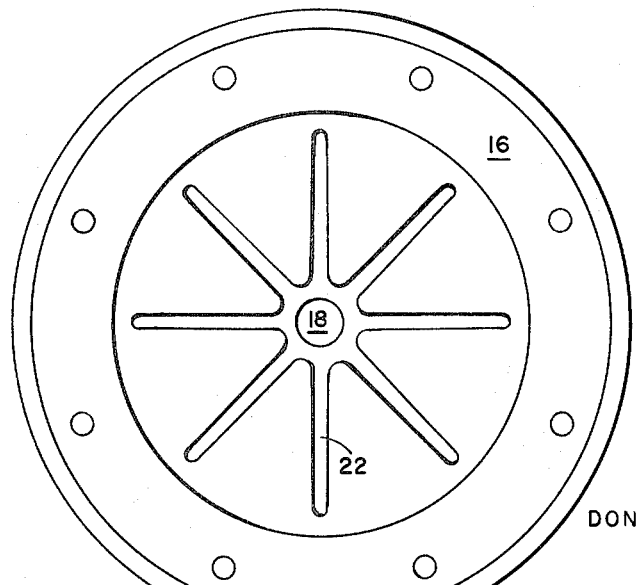
DONALD R. WALKER
INVENTOR.
BY Alden D. Redfield
Melvin E. Frederick
ATTORNEYS Sept. 21, 1965 D. R. WALKER 3,207,640
METHOD OF MAKING REINFORCED MATERIAL
Original Filed Feb. 18, 1958 2 Sheets-Sheet 2

DONALD R. WALKER
*INVENTOR.*

BY Alden D. Redfield
Melvin E. Frederick
ATTORNEYS

United States Patent Office

3,207,640
Patented Sept. 21, 1965

3,207,640
METHOD OF MAKING REINFORCED MATERIAL
Donald R. Walker, Reading, Mass., assignor to Avco Corporation, Cincinnati, Ohio, a corporation of Delaware
Original application Feb. 18, 1958, Ser. No. 715,985. Divided and this application Dec. 14, 1961, Ser. No. 160,414
5 Claims. (Cl. 156—72)

The present invention relates to methods of making reinforced material which is particularly resistant to wear, abrasion, and erosive action at high temperatures. Material made in accordance with the present invention possesses such desirable characteristics not only at room temperature but also at extremely high temperatures. This attribute renders such material particularly useful under extreme environmental conditions. This application is a division of my copending application, Serial No. 715,985, filed February 18, 1958, for "Reinforced Material and Method of Making the Same."

More specifically, the present invention concerns a method of making reinforced material in which the reinforcement has the form of a rug comprising a backing and pile perpendicular to the backing. In the finished material, the reinforcement is oriented so that the backing is substantially parallel to one face of the material, and the pile is perpendicular to the other face. For certain applications a foundation member may also be bonded intimately to the face of the material adjacent and parallel to the backing of the reinforcement.

In carrying out the present invention, a wide variety of substances may be used to impregnate the reinforcement. The particular substance used is a function of the intended application. The impregnating substance, which when solidified forms a matrix in which the reinforcement is embedded, may also contain particulate inclusions which are added to enhance the properties of the finished material.

Briefly, the method of the present invention comprises the steps of supporting the rug reinforcement on a foundation sheet with the backing of the reinforcement resting on the sheet and the pile projecting away therefrom, and introducing resin to the reinforcement through a plurality of perforations formed in the foundation sheet. Impregnation may be accomplished by forcing the resin into the reinforcement either under positive pressure, or under the influence of a vacuum. Since the resin gradually seeps from the backing through the pile, there is no tendency for the pile to be deflected or matted, and the finished material is relatively free of voids caused by entrapped air bubbles. The specific type of resin used is not critical except as may be dictated by special applications for which the material is intended. The saturated reinforcement is heat cured at moderate temperatures to form a rigid, reinforced material. After curing, the material may be machined, ground or finished by conventional processes.

In accordance with the present invention, it has been found by actual experiments that fiber glass reinforced plastic is amazingly resistant to erosive action at high temperatures if the glass fibers are oriented normal to the heated surface. This makes it ideally suited for use in combustion chambers, bearings and the like.

Experiments indicate that a plastic reinforced by glass fibers oriented normal to the surface to be subjected to wear and the like resists erosive action at high temperatures very effectively. The phenomenal performance is not well understood but it is generally believed that the plastic matrix dissociates at elevated temperatures producing a gas which washes over the surface of the material and tends to shield it from high velocity combustion products and the like. The exposed glass reinforcing fibers may even soften at the temperatures encountered and produce a molten layer of material which spreads uniformly over the surface of the material. Some of the glass may even vaporize to supplement the protective gaseous shield. The reduction in heat transfer, coupled with the low thermal conductivity of the material, preserves the structural integrity of the material and assures satisfactory performance.

Orientation of the reinforcing fibers normal to a surface of reinforced plastic articles in accordance with the present invention appears to be of fundamental importance for satisfactory performance. For one thing, the fibers, being embedded in the matrix perpendicular to the surface, are securely anchored and are not separable from the matrix as an entity under the influence of high velocity gases or abrasive forces. Secondly, the surface of such articles remains relatively smooth and does not become irregular as would be the case if reinforcing fibers were exposed parallel to the surface. For this reason, heating due to surface irregularities, is minimized. Homogeneity of the material is also of importance and is attained by the close-packed glass fibers extending to the surface of the material.

The present invention provides a simple and effective form of material having the requisite qualities recommended for combustion chambers, bearings and the like. By using a reinforcement in the form of a fiber glass rug, orientation of glass fibers normal to the exposed surface is readily attained. Handling of the fibers is simplified as is impregnation of the reinforcing rug by the matrix material. In addition, the backing of the rug presents a strengthening member which imparts strength to the material even when the surface remote therefrom is heated.

The present invention lends itself readily to the manufacture of numerous articles, such as, for example, tubular pieces, bearings and combustion chamber liners. By using substances other than plastic and glass, a reinforced material can be produced suitable for use in a wide variety of applications where wear, abrasion or erosive action at high temperatures are of importance. Such materials will be described in greater detail later in this application.

In view of the foregoing, it is a general object of the present invention to provide an improved method of making reinforced material.

More particularly, it is an object to provide a method of making reinforced material in which the reinforcement includes fibers oriented normal to one face of the material.

Another object of the invention is to provide a method of making a material reinforced by fibers oriented normal to one face of the material and strengthened at its other face by a foundation member.

Still another object of the present invention is the provision of a method of making reinforced material having particulate inclusions of substances which impart preferred qualities to the material.

Other objects of the invention are as follows:
(a) Provision of a method of impregnating a reinforcement in the form of a rug having a backing and pile perpendicular thereto;
(b) Provision of a special cavity molding process for impregnating a rug type reinforcement without matting of its pile;
(c) Provision of a method of making fiber glass reinforced plastic for use in combustion chambers;
(d) Provision of a method of making a bearing material including reinforcing fibres oriented normal to its surface.

The novel features that are considered characteristic of the invention are set forth in the appended claims; the invention itself, however, both as to its organization and method, together with additional objects and advantages thereof, will best be understood from the following description of specific embodiments when read in conjunction with the accompanying drawings, in which:

FIGURE 1 is a cross sectional view taken through a reinforcement for use in making material of the present invention;

FIGURE 2 is a cross sectional view of the reinforced material;

FIGURE 3 is a cross sectional view of a modified form of the material including a foundation member and particulate inclusions;

FIGURE 4 is a cross sectional view of a device for impregnating the reinforcement;

FIGURE 5 is a view of the lower half of the device taken on plane 5—5 of FIGURE 4;

General description of material

Figure 6:
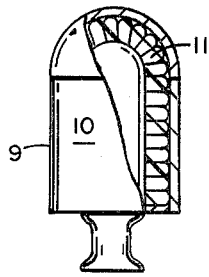
FIGURE 6 shows an elevational view of a combustion chamber for a rocket engine, the side wall of the chamber being broken away to show its interior construction.

In FIGURE 1 is illustrated a reinforcement in the form of a rug comprising a backing 1 with which pile 2 is intimately engaged. In general, the backing comprises warp and woof filaments woven as in a conventional domestic carpet to interlock and support the pile substantially perpendicularly to the plane defined by the backing.

This reinforcement is embedded in a matrix 3 (see FIGURE 2) in such fashion that the pile is oriented perpendicularly to face 4 of the material and the backing is oriented parallel to the opposite face 5 of the material. As will be evident from FIGURE 2, the material is homogeneous near surface 4 with the filaments of the pile relatively evenly spaced in the matrix and oriented perpendicularly to the surface. The backing affords reinforcement in directions perpendicular to the pile.

Referring now to FIGURE 3, a modification of the material is disclosed in which the reinforcement is embedded in matrix 3, and particles 6, of a substance different from the matrix, are also embedded in the matrix. By including different types of particles, the characteristics of the finished material can be varied at will. FIGURE 3 also illustrates the provision of a foundation member 7 which is bonded to the face of the material which is adjacent and parallel to the backing of the reinforcement. It will be understood by those skilled in the art that provision of particulate inclusions and a foundation member are not interrelated and may be used together or separately, depending upon the particular application for the material.

The substance used in making the reinforced material can vary widely. For resistance to erosion at high temperatures, it has been found effective to make the reinforcement from glass fibers and to impregnate the reinforcement with a resinous plastic matrix.

The type of resin in itself is not critical and may be of the phenolic, epoxide, melamine, silicone, furane, or other type. It has been found effective to use an epoxide resin made from epichlorohydrin and diphenyl propane cured by phthalic anhydride. The preferred method of impregnating the reinforcement with such a plastic will be described later in the application.

It is also deemed effective to make the reinforcement from silicon dioxide, from asbestos, or from nylon. As is true of the matrix, substances for making reinforcements are chosen with a view toward the ultimate application of the material.

In order to increase the percentage of glass in the material, glass particles may be mixed with the matrix, as described with reference to FIGURE 3. Instead of glass particles, particles of beryllium or magnesium oxide can be used for high temperature applications, since such particles have a high melting point and a relatively high latent heat of fusion. Particles of salts, such as aluminum fluoride, which vaporize or decompose at low temperature, can also be added.

For bearing applications, a fiber glass reinforced resinous matrix may be used. Performance of the material can be enhanced by addition of graphite or other lubricating particles which lubricate the surface of the bearings as they are exposed by bearing wear. For underwater bearings, the material may consist of fibre glass reinforced rubber.

The invention also contemplates the formation of reinforced materials by impregnating a suitable reinforcement, made for instance of glass or metal, with a matrix of clay or ceramic which when fired forms a homogeneously reinforced material.

Specific materials

A material made in accordance with the present invention may consist of a fiber glass reinforcement made from allow alkali borosilicate glass which is impregnated with an epoxide resin cured by phthalic anhydride.

Epoxide materials have been successfully made by using 100 parts of Armstrong C–4 epoxy resin to which has been added 37½ parts by weight of Armstrong Activator "J," both made Armstrong Products Co., of Warsaw, Indiana. After impregnation, the resulting material was cured 2½ hours at 210° Fahrenheit.

The cured product can easily be machined by carbide-tipped cutting tools.

Material made in accordance with the present invention may have 60–65% glass by weight, although this weight ratio should not be considered a critical limitation. The proportion by weight can be controlled to a large extent by the density of the pile of the reinforcing rug. Further, the proportion of glass present can be increased through the addition of glass particles to the matrix resin.

The reinforcing rug may also be fabricated from silicon dioxide. As mentioned earlier in the application, beryllium oxide and magnesium oxide particles can also be added.

A particular embodiment of the present invention is illustrated in FIGURE 6. This illustrates a combustion chamber 9 for a rocket engine having an outer metallic wall 10 within which a fiber glass reinforced plastic material 11 is provided as a liner. It will be noted that the filaments of the pile extend radially inwardly toward the center of the combustion chamber and are disposed substantially normal to the interior surface.

It will be understood by those skilled in the art that the liner of such a combustion chamber operates at extremely high temperatures and must also be resistant to abrasion and erosion at high temperatures. Combustion chambers of gas turbine engines can be built in much the same fashion.

Figure 7:
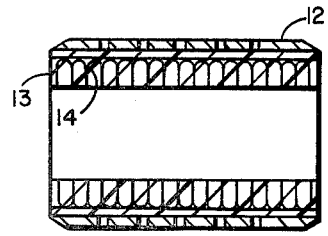
FIGURE 7 is a longitudinal sectional view through a plain bearing made in accordance with the present invention.

In FIGURE 7 is illustrated a plain bearing formed within a metallic sleeve 12 which serves as a foundation member. As illustrated the bearing comprises a rug type reinforcement 13 which is impregnated by a resin matrix 14. The pile of the reinforcement extends radially inwardly and is substantially normal to the interior cylindrical surface of the bearing. The matrix material may be bonded to the metallic shell of the bearing as will be described shortly. A modification of the bearing illustrated in FIGURE 7 consists of the addition of graphite particles to the matrix material. These lubricate the surface of the bearings as it is worn away to expose the particles.

Bearings formed in accordance with the present invention are extremely stiff in radial directions parallel to the pile, but are more yielding in directions perpendicular to the pile.

Description of Method

In accordance with the present invention, the preferred method of making a reinforced material consists of fabricating the reinforcement in the form of a rug and introducing the matrix material through the backing in a direction parallel to the filaments of the pile. This will be well understood with reference to FIGURE 4 which shows a device for fabricating the material. The device consists of an upper half 15 and a lower half 16, which are tightly clamped together, as by bolts 17, at their peripheries. The shape of the device in plan view can be adapted to the particular type and shape of material desired. For illustrative purposes, it is shown to be circular in shape, as illustrated in FIGURE 5.

The lower half of the device includes an inlet 18 through which liquid resin may be introduced, as indicated by arrow 19. The resin can be caused to flow through the inlet either by pressure positively applied to it or through evacuation of the upper half of the device through outlet 20, such as indicated by the arrow 21. Either way the resin will be caused to rise in the lower half of the device until it is distributed by gates 22 uniformly underneath foundation plate 23. This plate, which may be made of stainless steel or any other metallic or nonmetallic material, is perforated as indicated at 24. Through these perforations the liquid resin is introduced to the rug type reinforcement 25 which rests upon the foundation plate with its backing adjacent the plate and its pile extending perpendicularly away therefrom.

The foundation plate may be shaped as needed to form pieces of material that do not lie in a single plane.

As the resin gradually rises through the backing and pile of the reinforcement, air is displaced from the reinforcement and an intimate wetting of all of the filaments of the reinforcement is assured. It is desirable not to feed the plastic up through the pile at too fast a rate lest air bubbles be entrapped and voids created in the finished material. Should such bubbles be present, it may be desirable to recirculate the plastic up through the reinforcement until all of the air bubbles are removed.

After the reinforcement is thoroughly saturated, the inlet 18 can be plugged and the entire chamber placed in an over for polymerizing the liquid resin. After the material has cured, the bolt 17 can be removed and the foundation sheet 23, with the reinforced plastic material adhered thereto, can be removed and machined to final form.

Should it be desirable to produce reinforced material without a foundation member, it is merely necessary to coat the foundation member with a release material. Common ones frequently used are wax and polyvinyl alcohol.

As will be understood by those skilled in the art, the foregoing is a novel modification of the cavity molding technique which is frequently used for impregnating mat-type reinforcing material with plastic. It will also be understood that prior to the introduction of the resin, it is desirable to desize the reinforcement if it is made of fiber glass. This is preferably done through heat treatment of the material since it leaves a minimum residue of size and also is very effective in driving off moisture, the presence of which will interfere with the bonding of the resin to the fiber glass. After desizing, it is desirable to apply a finish such as methacrylate chromic chloride to the fiber glass to enhance bonding of the resin to the fibers. Various types of finishes are commercially available and are well known.

Figure 8:
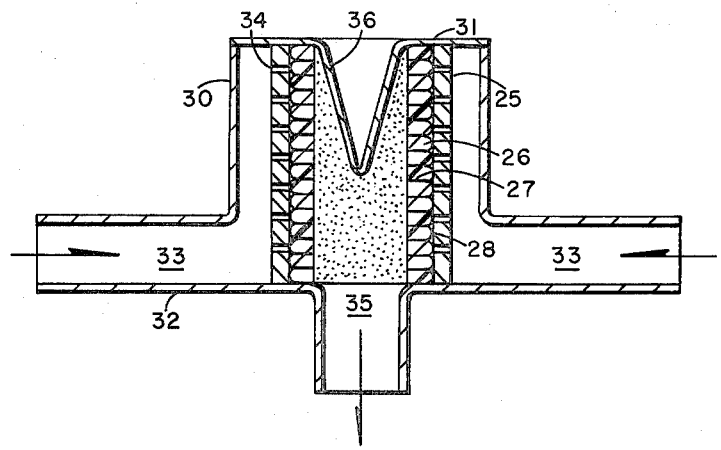
FIGURE 8 is a diagrammatic showing of a device for performing the method of this invention in making bearings.

FIGURE 8 illustrates a device for forming cylindrical bearings. Shown at 25 is a rigid foundation cylinder within which a reinforcing rug 26 is disposed with its pile 27 extending radially inwardly and its back 28 adjacent the inner surface of the cylinder. The cylinder is enclosed in housing 30 and is clamped between top wall 31 and bottom wall 32. Liquid resin is introduced through a plurality of side inlets 33 so that the resin distributes evenly around the cylinder. It seeps through perforations 34 of the cylinder, through the backing of the reinforcement and radially inwardly through the pile. Excess resin may leave the housing by outlet 35.

The operation resembles that described with reference to FIGURE 4. The reinforcement is thoroughly saturated without matting of the pile.

Re-entrant wall 36 may be provided to conserve resin which would otherwise occupy the space within the bearing.

An excellent analysis of conventional methods of making reinforced plastic will be found in the text, "Glass Reinforced Plastics," edited by Phillip Morgan and published in the United States by Philosophical Library, Inc. (second edition 1957).

Forming reinforced material

As will be understood from the foregoing, the reinforced material can be bonded securely to a foundation member, such as illustrated at 7 in FIGURE 3. The foundation member can be provided for additional strength purposes or can be provided to facilitate the formation of the reinforced material in a particular configuration. The foundation member, which may be metallic, aids in holding the reinforcement prior to impregnation. The reinforcement necessarily must be relatively flexible to conform to the contour of the foundation member. In FIGURE 6 a metallic shell 10, forming the outer wall of the combustion chamber, may be provided to support the inner reinforcement while it is being impregnated. Again, the bearing in FIGURE 7 includes a metallic sleeve 12 which may serve as the foundation member.

It will be understood that the provision of the foundation member is optional. It may be made of a metal or nonmetal suitably chosen with due regard for the coefficient of expansion of the matrix and its curing temperature.

Flexibility of the reinforcing rug can be improved by weaving it so that the backing includes a certain percentage of nylon or other stretchable fibers. For extreme flexibility in one direction, all of the warp or all of the woof threads may be made of nylon. The flexibility imparted by the nylon also makes it possible to increase the density of the pile since the backing may be stretched as the rug is woven. After weaving, the release of the backing crowds the pile densely together.

For special applications, it may be desirable to make the entire reinforcement, both backing and pile, of nylon. This material also vaporizes to provide a protective gaseous layer at the surface of the material when subjected to high temperature.

It should be understood that the particular weave of the rug does not in any way constitute a limitation of the present invention. For many applications the backing of the rug would be a balanced weave so that the rug would have equal strength in all directions perpendicular to the pile. This is not necessary, however, and other special backing weaves can be used to attain a type and degree of flexibility that is suited to the final product being fabricated.

Summary

In view of the foregoing, it will be understood that the present invention provides an improved and simple method of making reinforced material which not only facilitates elimination of air from the reinforcement while it is impregnated, but also guarantees that the pile of the reinforcement will not be deflected or matted. In this way, orientation of the pile normal to one face of the finished material is assured.

The various features and advantages of the invention are thought to be clear from the foregoing description. Other features and advantages not specifically enumerated, will undoubtedly occur to those versed in the art, as likewise will many variations and modifications of the par-

I claim:

1. The method of producing a substantially solid sheet of reinforced material which comprises:
supporting a reinforcement comprising a backing and pile attached to and extending substantially prependicularly from said backing by a foundation member adjacent the backing;
introducing through said foundation member to the backing a matrix material in liquid form;
establishing flow of said material as a liquid through the pile by subjecting the liquid to a pressure differential; and
treating said matrix material to provide said solidified sheet of matrix material in which said foundation member and said reinforcement are substantially completely embedded.

2. The method of producing a substantially solid sheet of reinforced material which comprises:
supporting a reinforcement comprising a backing and pile attached to and extending substantially perpendicularly from said backing by a foundation member adjacent the backing;
introducing through said foundation member to the backing a matrix material in liquid form and including particulate inclusions;
establishing flow of said material as a liquid through the pile by subjecting the liquid to a pressure differential; and
treating said matrix material to provide a solidified matrix having substantially no voids, and to bond said foundation member to said reinforcement, providing said sheet of resinous material in which said foundation member and said reinforcement are substantially completely embedded.

3. The method of producing a sheet of reinforced resinous material resistant to erosion at high temperatures which comprises:
supporting a siliceous reinforcement comprising a backing and pile attached to and extending substantially perpendicularly from said backing by a foundation member adjacent the backing;
introducing through said foundation member to the backing a polymerizable resin in liquid form;
establishing flow of said material as a liquid through the pile by subjecting the liquid to a pressure differential; and
treating said matrix material to provide a polymerized resin sheet having substantially no voids and in which said reinforcement is substantially completely embedded.

4. The method of producing a substantially solid cylinder of reinforced material which comprises:
separably supporting a reinforcement comprising a backing and pile attached to and extending substantially perpendicularly from said backing within a permeable cylindrical member adjacent said backing, said pile extending substantially radially inwardly when disposed within said cylindrical member;
introducing a hardenable matrix material in liquid form through said member to the backing;
establishing flow of said material in liquid form through said pile from the exterior to the interior of said reinforcement by subjecting the material to a pressure differential; and
removing said reinforcement from said member after the matrix material has hardened to form said solid cylinder.

5. The method of producing a substantially solid cylinder of reinforced material which comprises:
disposing a flexible reinforcement comprising a backing and pile attached to and extending substantially perpendicularly from said backing within a permeable cylindrical foundation member adjacent the backing, said pile extending substantially radially inwardly when disposed within said cylindrical member;
introducing through said foundation member to the backing a matrix material in liquid form;
establishing flow of said material in liquid form through the pile from the exterior to the interior of the said reinforcement by subjecting the material to a pressure differential; and
treating said matrix material to provide a solidified matrix in which said foundation member and said reinforcement are substantially completely embedded.

References Cited by the Examiner

UNITED STATES PATENTS

| | | | |
|---|---|---|---|
| 1,742,568 | 1/30 | Addy et al. | 117—61 XR |
| 2,456,093 | 12/48 | Swedlow | 156—285 |
| 2,495,640 | 1/50 | Muskat | 156—224 |
| 2,524,456 | 10/50 | Masland | 154—49.29 |
| 2,606,574 | 8/52 | Lefebvre | 156—294 |
| 2,707,158 | 4/55 | Issum | 117—61 XR |
| 2,987,880 | 6/61 | Kimmel | 154—44 |
| 2,998,337 | 8/61 | Tillotson | 154—44 |

FOREIGN PATENTS 123,758  6//45  Australia.

ALEXANDER WYMAN, Primary Examiner.

EARL M. BERGERT, HAROLD ANSHER, Examiners.